(12) United States Patent
van den Boogaard

(10) Patent No.: US 9,381,582 B2
(45) Date of Patent: Jul. 5, 2016

(54) MILLING TOOL WITH RECESSED CUTTING EDGE

(75) Inventor: Wilco van den Boogaard, Swolgen (NL)

(73) Assignee: SECO TOOLS AB, Fagersta (SE)

( * ) Notice: Subject to any disclaimer, the term of this patent is extended or adjusted under 35 U.S.C. 154(b) by 159 days.

(21) Appl. No.: 14/127,999

(22) PCT Filed: Jun. 27, 2012

(86) PCT No.: PCT/EP2012/062469
§ 371 (c)(1),
(2), (4) Date: Dec. 20, 2013

(87) PCT Pub. No.: WO2013/004568
PCT Pub. Date: Jan. 10, 2013

(65) Prior Publication Data
US 2014/0126968 A1    May 8, 2014

(30) Foreign Application Priority Data

Jul. 1, 2011 (EP) .................................... 11172316

(51) Int. Cl.
| B23B 5/10 | (2006.01) |
| B23C 5/10 | (2006.01) |
| B23C 5/00 | (2006.01) |

(52) U.S. Cl.
CPC . *B23C 5/10* (2013.01); *B23C 5/006* (2013.01); *B23C 5/1009* (2013.01); *B23C 2210/287* (2013.01); *B23C 2220/366* (2013.01); *Y10T 407/1946* (2015.01); *Y10T 407/1948* (2015.01)

(58) Field of Classification Search
CPC .................. Y10T 407/1946; Y10T 407/1948; Y10T 407/195; Y10T 407/1952; Y10T 407/1954; Y10T 407/1956; Y10T 407/1958; Y10T 407/196; Y10T 407/1962; Y10T 407/1964; Y10T 407/1966; B23C 5/00; B23C 5/10; B23C 5/006; B23C 2220/366; B23C 2215/52; B23C 2215/56
USPC ...................................................... 407/53–63
See application file for complete search history.

(56) References Cited

U.S. PATENT DOCUMENTS

| 2,039,427 A | * | 5/1936 | Kinzbach | B23C 5/20 175/426 |
| 3,678,554 A | * | 7/1972 | Ezhov | B23C 5/14 407/115 |

(Continued)

FOREIGN PATENT DOCUMENTS

| CN | 2853244 Y | * | 1/2007 |
| DE | 3700754 A1 | | 7/1987 |

(Continued)

*Primary Examiner* — Daniel Howell
*Assistant Examiner* — Nicole N Ramos
(74) *Attorney, Agent, or Firm* — Corinne R. Gorski

(57) ABSTRACT

A milling tool includes a tool body having a longitudinal axis and a first end. A plurality of flutes are provided in the tool body and extend to the first end of the tool body. A plurality of cutting edges are provided. Each cutting edge is associated with a respective one of the plurality of flutes, each cutting edge being substantially identical to each other one of the plurality of cutting edges except that at least one but not all of the cutting edges is a recessed cutting edge and at least one but not all of the cutting edges is a non-recessed cutting edge. Each recessed cutting edge begins at a non-zero distance from the first end of the tool body and each non-recessed cutting edge extends to the first end of the tool body.

11 Claims, 3 Drawing Sheets

(56) References Cited

U.S. PATENT DOCUMENTS

| | | | | |
|---|---|---|---|---|
| 4,411,563 | A | * | 10/1983 | Moon ................. B23B 1/02 407/54 |
| 5,188,488 | A | | 2/1993 | Nakayama et al. |
| 5,899,252 | A | * | 5/1999 | Pozzo ................. B23C 3/126 144/135.2 |
| 5,908,269 | A | * | 6/1999 | Cox ................. B23C 3/28 407/59 |
| 6,164,876 | A | * | 12/2000 | Cordovano ............ B23C 5/10 407/59 |
| 6,168,355 | B1 | * | 1/2001 | Wardell ............... B23C 5/10 407/54 |
| D538,128 | S | * | 3/2007 | Watanabe .............. D15/139 |
| 7,278,806 | B1 | * | 10/2007 | Clayton ............... B23C 3/12 144/347 |
| 2006/0110225 | A1 | * | 5/2006 | Dov ................. B23B 1/08 407/53 |
| 2007/0098506 | A1 | * | 5/2007 | Flynn ............... B23V 5/003 407/53 |
| 2007/0286691 | A1 | * | 12/2007 | Glimpel ............... B23C 5/10 407/54 |
| 2008/0170917 | A1 | * | 7/2008 | Hilker ............... B23C 5/1054 407/54 |
| 2008/0193232 | A1 | * | 8/2008 | van Iperen ............ B23C 5/10 407/54 |
| 2009/0092452 | A1 | | 4/2009 | Sato et al. |
| 2011/0091293 | A1 | * | 4/2011 | Itoh ................. B23C 3/30 407/40 |

FOREIGN PATENT DOCUMENTS

| | | | |
|---|---|---|---|
| DE | 3742942 | C1 * | 12/1988 |
| DE | 102007055842 | A1 | 11/2008 |
| DE | 102007055842 | A1 * | 11/2008 |
| EP | 1834720 | A1 | 9/2007 |
| GB | 1161969 | A | 8/1969 |
| JP | 51128778 | A | 11/1976 |
| JP | 2083108 | A | 3/1990 |
| JP | 2001246514 | A * | 9/2001 |
| JP | 200490168 | A * | 3/2004 |
| WO | 02070181 | A2 | 9/2002 |
| WO | 2008100678 | A1 | 8/2008 |

* cited by examiner

MILLING TOOL WITH RECESSED CUTTING EDGE

RELATED APPLICATION DATA

This application is a §371 National Stage Application of PCT International Application No. PCT/EP2012/062469 filed Jun. 27, 2012 claiming priority of EP Application No. 11172316.9, filed Jul. 1, 2011.

BACKGROUND AND SUMMARY

The present invention relates to milling tools and, more particularly, to milling tools with recessed and non-recessed cutting edges.

In the manufacture of turbine rotors, it is conventional to form grooves using a milling cutter having a plurality of cutting edges defining teeth of increasing size as distance from a top of the cutter increases so that the cutter resembles a "fir tree". Removal of chips from the groove during the milling operation is important to, among other things, prevent the cutter from becoming jammed. One way of preventing jamming is to remove portions of some cutting edges, such as is shown in JP51128778A, however, this can involve complex machining.

It is desirable to provide a milling cutter for forming grooves in a workpiece that can facilitate removal of chips from the groove during milling. It is particularly desirable to provide such a milling cutter for forming "fir tree" shaped grooves.

In accordance with an aspect of the present invention, a milling tool includes a tool body having a longitudinal axis and a first end, a plurality of flutes provided in the tool body and extending to the first end of the tool body, and a plurality of cutting edges, each cutting edge being associated with a respective one of the plurality of flutes, each cutting edge being substantially identical to each other one of the plurality of cutting edges except that at least one but not all of the cutting edges is a recessed cutting edge and at least one but not all of the cutting edges is a non-recessed cutting edge, each recessed cutting edge beginning at a non-zero distance from the first end of the tool body and each non-recessed cutting edge extending to the first end of the tool body, each land associated with each recessed cutting edge having a substantially planar recess therein extending from the beginning of the recessed cutting edge to the first end of the tool body.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1A:
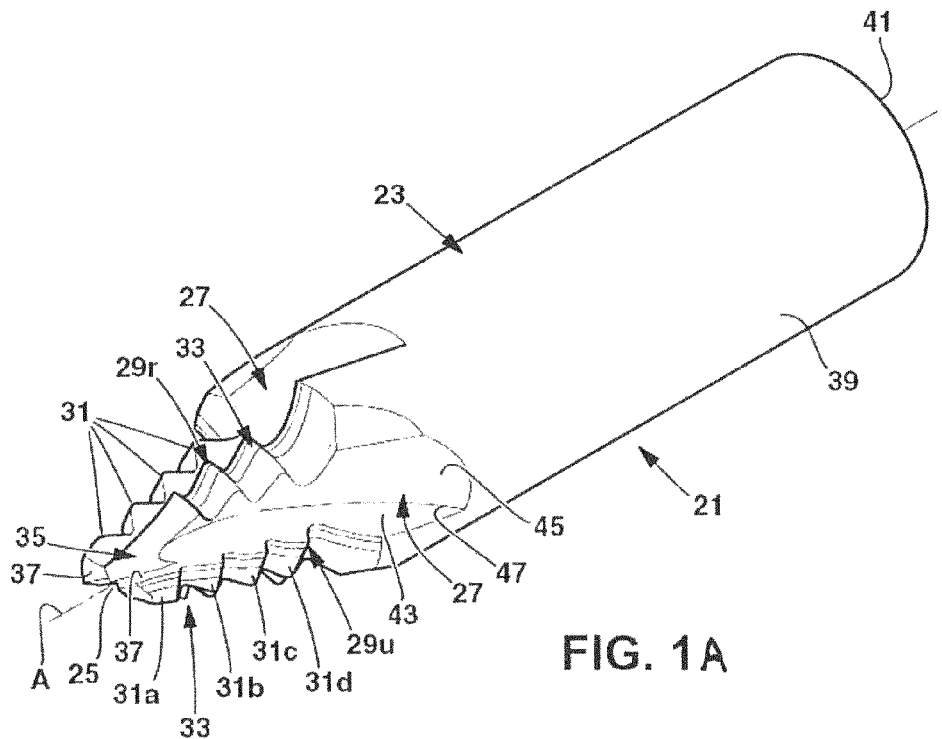
FIGS. 1A and 1B are perspective views of milling tools according to aspects of the present invention.

A milling tool 21 according to an aspect of the present invention is shown in FIG. 1A and comprises a tool body 23 having a longitudinal axis A and a first end 25. A plurality of flutes 27 are provided in the tool body 23 and extend to the first end 25 of the tool body. A plurality of cutting edges is also provided.

Each cutting edge is associated with a respective one of the plurality of flutes 27. Each cutting edge is substantially identical to each other one of the plurality of cutting edges except that at least one 29r but not all of the cutting edges is recessed and at least one 29u but not all of the cutting edges is non-recessed. Each recessed cutting edge 29r begins at a non-zero distance from the first end 25 of the tool body 23 and each non-recessed cutting edge 29u extends to the first end of the tool body.

In the illustrated embodiment, each cutting edge 29r, 29u comprises a plurality of teeth 31. The non-recessed cutting edges 29u, in the illustrated embodiment, have four teeth 31a, 31b, 31c, and 31d. Each recessed cutting edge 29r is recessed to eliminate at least one tooth 31a closest to the first end 25 of the tool body 23. In the illustrated embodiment, part of a second tooth 31b is also eliminated. Recessing a cutting edge 29r to eliminate one or more teeth closest to the first end 25 of the tool body 23 facilitates removal of chips from a workpiece near the first end of the tool body. It is not uncommon for there to be a limited amount of space in the flutes 27 toward the first end 25 of the tool body 23 and removal of part of the cutting edge 29r provides more room between the tool 21 and the walls of the groove being formed in the workpiece for the chips to make their way out of the groove.

In the illustrated embodiment, each cutting edge 29r, 29u comprises a plurality of teeth 31 that extend further from the longitudinal axis as distance from the first end 25 of the tool body 23 increases. The resulting shape resembles a "fir-tree" and is typically used to machine grooves for mounting blades in turbine rotors (not shown). It will be appreciated, however, that the firs-tree shape is not a necessary aspect of the invention, and other shapes can be provided.

Figure 2A:
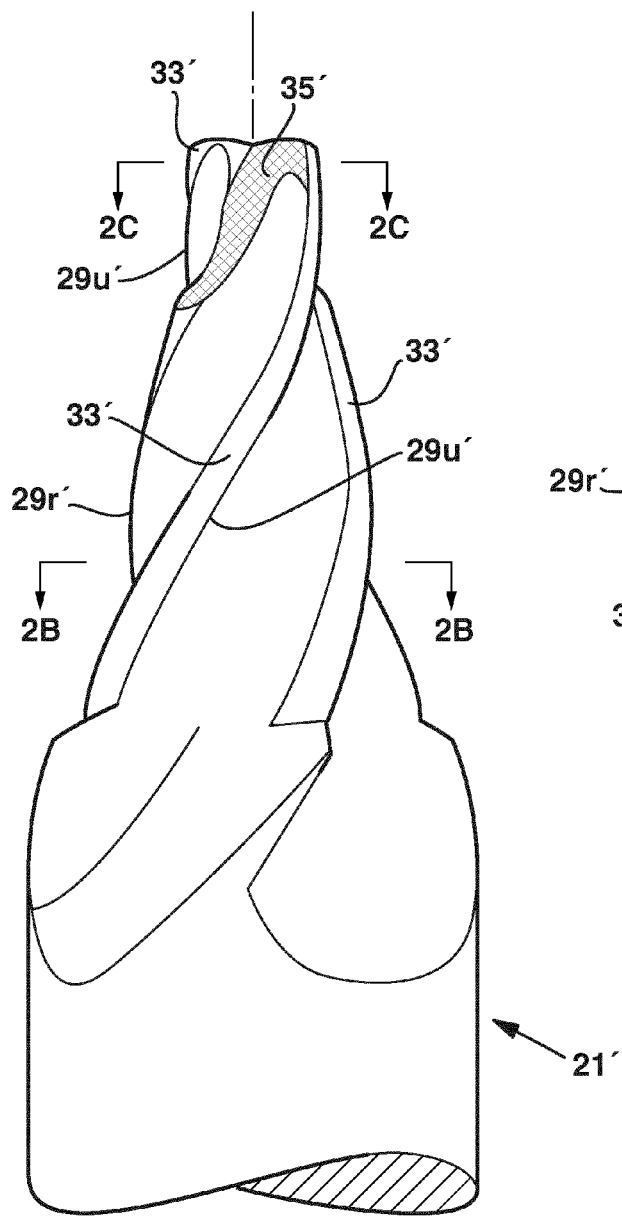
FIG. 2A is a side view of a milling tool according to another aspect of the present invention.
Figure 2B:
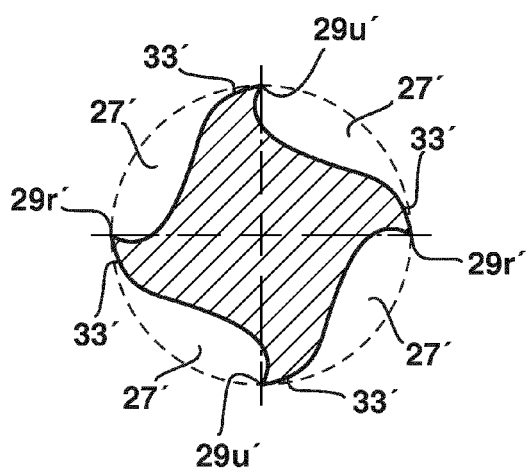
FIGS. 2B and 2C are sections of the milling tool of FIG. 2A taken at sections 2B-2B and 2C-2C, respectively.
Figure 2C:
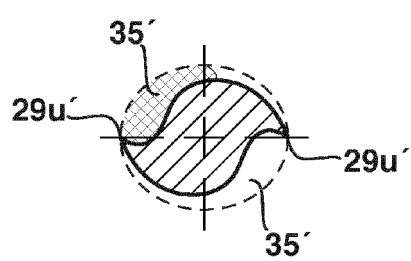

In the illustrated embodiment, each flute 27 of the plurality of flutes extends substantially parallel to the longitudinal axis A of the tool body. It will be appreciated, however, that the flutes may, instead, be more helical in shape. FIG. 2 shows another embodiment of a tool 21' with helical flutes 27', recessed and unrecessed cutting edges 29r' and 29u', respectively, and lands 33'. As seen in section 2B-2B, below a certain point, each cutting edge 29r' and 29u' has an associated land 33', however, closer to the end of the tool 21', the lands associated with the recessed cutting edges 29r' are recessed 35'. The helical tool 21' is shown as a non-toothed tool, however, the tool 21' can have all of the features of the tool 21, including teeth. Instead of recessing lands 33' to remove a tooth, in a non-toothed embodiment, a portion of the land close to the top of the tool is recessed. The amount of the land that is removed (or the number of teeth that are removed) will, for all embodiments, vary depending upon factors such the size of the tool and the intended application for the tool.

Ordinarily, as in the illustrated embodiment, an even number of flutes 27 is provided, and every other one of the plurality of cutting edges is a recessed cutting edge 29r. This facilitates removal of chips formed by a non-recessed cutting edge 29u. If the milling tool comprises three flutes, two or one of the associated cutting edges might be recessed.

Figure 1B:
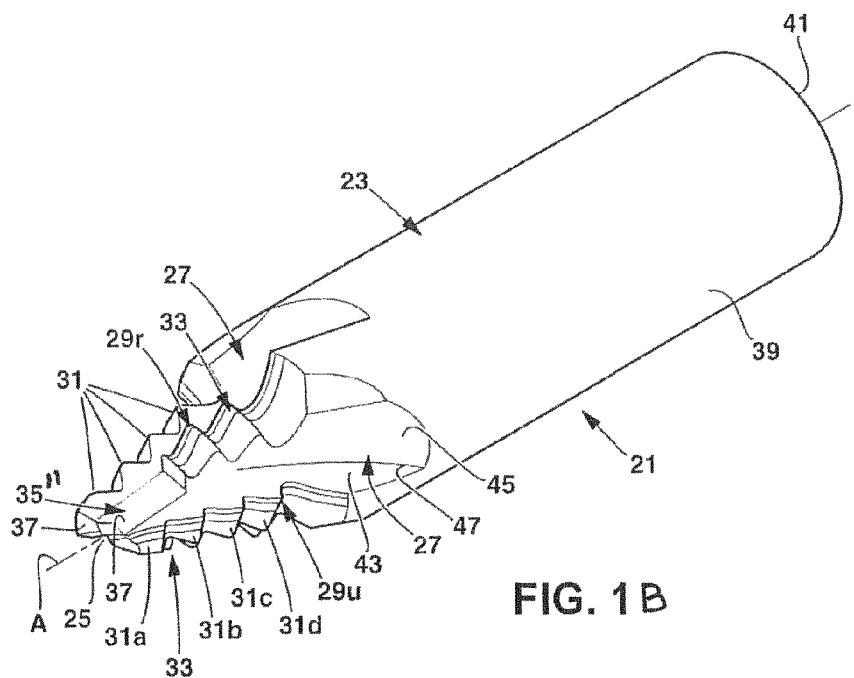

Each cutting edge 29r, 29u is substantially defined by an intersection between a respective flute 27 and an outer surface of the tool body. Each of the plurality of cutting edges 29r, 29u is disposed at an intersection of its associated flute 27 and an associated land 33. Each land 33 associated with each recessed cutting edge 29r has a recess 35 therein extending from the beginning of the recessed cutting edge to the first end 25 of the tool body 23. In the illustrated embodiment, each recess 35 is substantially planar, however, the recesses may be curved, such as by being concave toward the longitudinal axis of the tool. A milling tool 21 according to an aspect of the present invention is shown in FIG. 1B showing the same features as in FIG. 1A save for the planar recess 35" being angled substantially parallel to the rotational axis A.

A chisel edge 37 will ordinarily be associated with each non-recessed cutting edge 29u at the first end 25 of the tool body 23.

A shank portion 39 will ordinarily be provided at a second end 41 of the tool body. The shank portion 39 can be of any suitable type, such as a straight cylinder as shown, a threaded portion, or some other shape, such as might be used in any one of a variety of clamping arrangements.

The milling tool 21 may be a one-piece tool as illustrated, although the tool might be made with replaceable cutting inserts (not shown) instead of cutting edges 29r and 29u that are integral parts of the lands 33 as shown.

In the illustrated milling tool 21, each flute 27 comprises a first side wall 43 facing in a direction of rotation of the milling tool, and a second side wall 45 that intersects with the first side wall along a line of intersection 47 and forms a non-zero angle with the first side wall.

Figure 3:
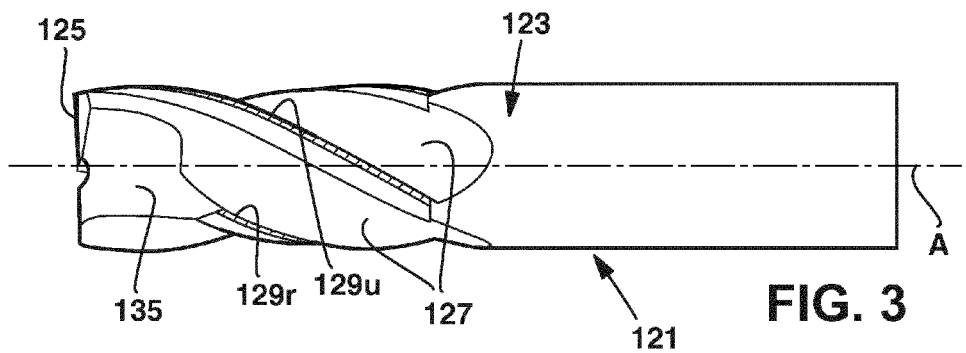
FIG. 3 is a side view of an end milling tool according to another aspect of the present invention.
Figure 4:
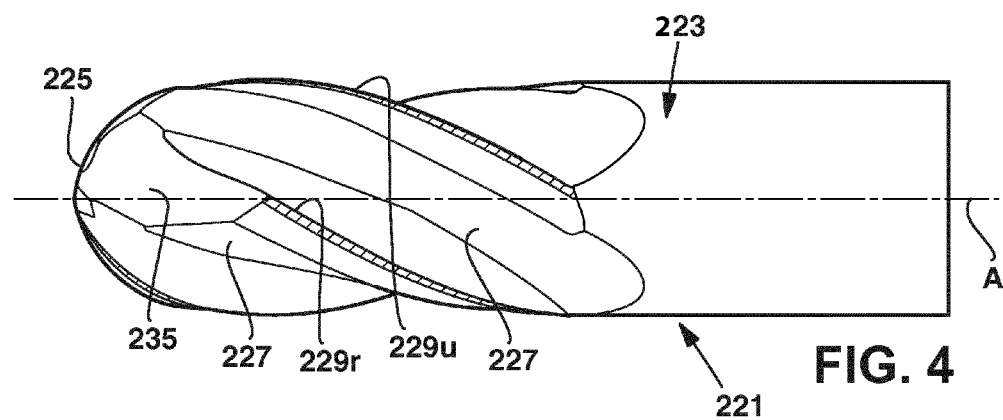
FIG. 4 is a side view of a ball nose milling tool according to another aspect of the present invention.
Figure 5:
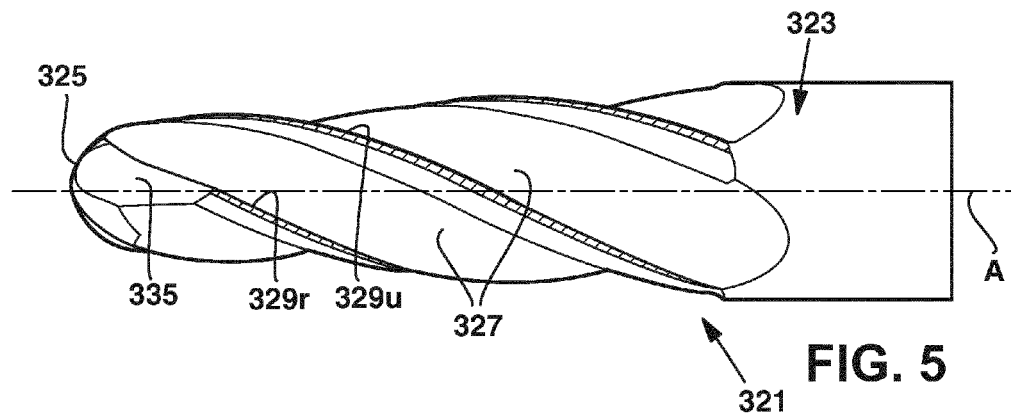
FIG. 5 is a side view of a tapered end milling tool according to another aspect of the present invention.

FIGS. 3-5 show other embodiments of milling tools 121, 221, and 321, respectively, according to aspects of the present invention. FIG. 3 shows an end mill tool 121; FIG. 4 shows a ball nose end mill tool 221; and FIG. 5 shows a tapered end mill tool 321. Unlike the milling tool 21, the tools 121, 221, and 321 do not include teeth, although teeth might be provided in other embodiments. The milling tools 121, 221, and 321 each comprise a tool body 123, 223, and 323, respectively, having a longitudinal axis A and a first end 125, 225, and 325. Each includes a plurality of flutes 127, 227, and 327 provided in the tool body and extending to the first end of the tool body. Each also includes a plurality of cutting edges 129r, 129u; 229r, 229u; and 329r, 329u, each cutting edge being associated with a respective one of the plurality of flutes. Each cutting edge is substantially identical to each other one of the plurality of cutting edges except that at least one but not all of the cutting edges is a recessed cutting edge 129r, 229r, and 329r and at least one but not all of the cutting edges is a non-recessed cutting edge 129u, 229u, and 329u. Each recessed cutting edge 129r, 229r, and 329r begins at a non-zero distance from the first end 125, 225, and 325 of the tool body 123, 223, and 323, with a recess 135, 235, and 335 disposed between the beginning of the recessed cutting edge and the first end of the tool body. Each non-recessed cutting edge 129u, 229u, and 329u extending to the first end 125, 225, and 325 of the tool body 123, 223, and 323.

The claimed structure facilitates simple manufacture of a recessed cutting edge by, e.g., a grinding operation with a cylindrical, rotating grinding surface. Thus, ease of manufacture is improved in combination with improved chip flow.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The disclosures in EP Patent Application No. 11172316.9, from which this application claims priority, are incorporated herein by reference.

What is claimed is:

1. A milling tool comprising:
    a tool body having a longitudinal axis and a first end;
    a plurality of flutes provided in the tool body and extending to the first end of the tool body;
    a plurality of cutting edges, each cutting edge being associated with a respective one of the plurality of flutes, wherein each cutting edge is substantially identical to each other one of the plurality of cutting edges except that at least one but not all of the cutting edges is a recessed cutting edge and at least one but not all of the cutting edges is a non-recessed cutting edge, each recessed cutting edge beginning at a non-zero distance from the first end of the tool body and each non-recessed cutting edge extending to the first end of the tool body, each of the plurality of cutting edges is disposed at an intersection of its associated flute and an associated land;
    a plurality of teeth disposed on each of the plurality of cutting edges; and
    a land associated with each recessed cutting edge, each land having a substantially planar recess therein extending from the beginning of the recessed cutting edge to the first end of the tool body, wherein each recessed cutting edge has one or more less teeth near the first end of the body than the non-recessed cutting edge to form the substantially planar recess.

2. The milling tool as set forth in claim 1, wherein the plurality of teeth extend further from the longitudinal axis as the distance from the first end of the tool body increases.

3. The milling tool as set forth in claim 1, wherein each flute of the plurality of flutes extends substantially parallel to the longitudinal axis of the tool body.

4. The milling tool as set forth in claim 1, further comprising an even number of flutes.

5. The milling tool as set forth in claim 1, wherein every other one of the plurality of cutting edges is recessed.

6. The milling tool as set forth in claim 1, wherein each cutting edge is substantially defined by an intersection between a respective and an outer surface of the tool body.

7. The milling tool as set forth in claim 1, further comprising a chisel edge associated with each non-recessed cutting edge at the first end of the tool body.

8. The milling tool as set forth in claim 1, further comprising a shank portion at a second end of the tool body.

9. The milling tool as set forth in claim 1, wherein the milling tool is a one-piece tool.

10. The milling tool as set forth in claim 1, wherein each flute includes a first side wall facing in a direction of rotation of the milling.

11. The milling tool as set forth in claim 10, wherein each flute includes a second side wall that intersects with the first side wall and forms a non-zero angle with the first side wall.

* * * * *